E. S. CLAPP.
Spectacles.
No. 79,898.  Patented July 14, 1868.
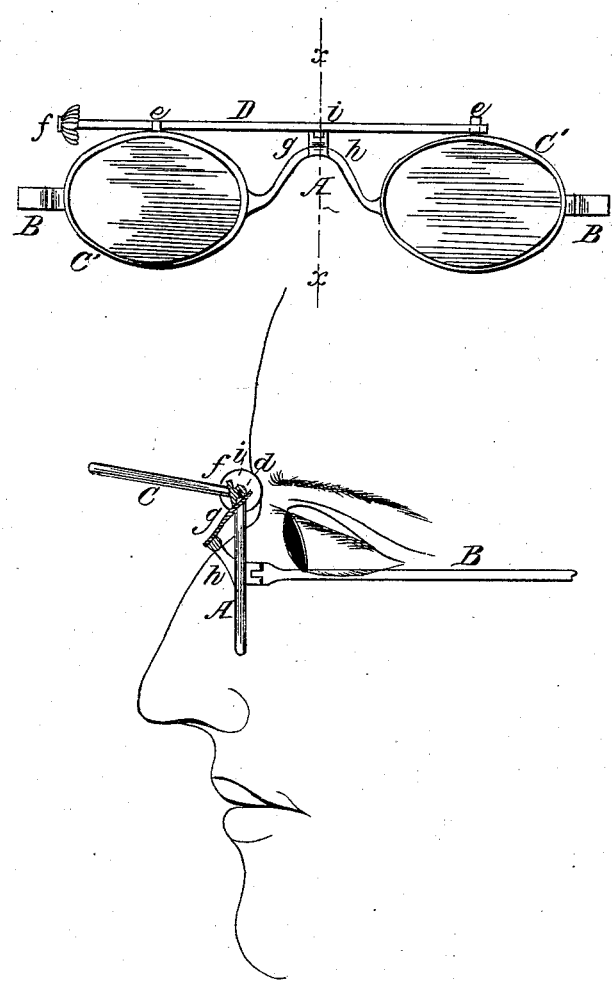

United States Patent Office.

ERASTUS S. CLAPP, OF MONTAGUE, MASSACHUSETTS, ASSIGNOR TO HIMSELF AND ISAAC CHENERY, OF SAME PLACE.

Letters Patent No. 79,898, dated July 14, 1868.

IMPROVEMENT IN SPECTACLES.

*The Schedule referred to in these Letters Patent and making part of the same.*

TO ALL WHOM IT MAY CONCERN:

Be it known that I, ERASTUS S. CLAPP, of Montague, in the county of Franklin, and State of Massachusetts, have invented a new and useful Improvement in Spectacles; and I do hereby declare that the following is a full, clear, and exact description thereof, which will enable those skilled in the art to make and use the same, reference being had to the accompanying drawings, forming part of this specification.

This invention has for its object to provide spectacles for those who use them, which shall not require to be removed from the nose when the glasses are not needed, whereby much trouble and inconvenience are avoided.

And the invention consists in attaching, by hinges, to a spectacle-frame (without glasses) another frame, containing glasses, and so arranged that they may be raised from the eyes without removing the first-mentioned frame from the nose, or disturbing it in any manner, as will hereinafter be more fully described.

Figure 1 represents the adjustable frame, with glasses therein closed down, as when in use.

Figure 2 is a vertical section of fig. 1, through the line $x\ x$.

Similar letters of reference indicate corresponding parts.

A represents a common spectacle-frame without glasses, but with bows attached in the ordinary manner for securing the frame to the head.

B represents the bows.

C is the adjustable frame, with glasses to suit the eye.

The rings $C'$, which hold the glasses, are attached rigidly to a rod, D, at $e\ e$.

This rod passes through eyes $e$, which are soldered to the top of the glass-rings of the frame A, as seen in the drawing, at $d$.

This rod D turns in the eyes $d$, forming a pivot-hinge at each ring.

$f$ is a button on the end of the rod D, by which the rod is turned and the glasses raised, as seen in fig. 2.

For the purpose of holding the adjustable glasses and frame C in the position seen in fig. 2, there is a small spring, $g$, attached to the centre of the projecting nose-bow $h$, as seen in the drawing.

Transversely across the rod D there is fixed a small flat piece of metal, $i$, against which the spring bears with a constant pressure, so that, when the glasses are down before the eyes, (or in use,) the spring, bearing against the piece $i$ on the rod, holds the glass-frame steady and in place.

When the glasses are raised from the eye, as seen in fig. 2, the bearing of the spring against the piece $i$, (as seen in the figure,) holds the glass-frame in that position.

It will thus be seen that, when the glasses are not needed, it is not necessary to raise the spectacles to the forehead, (as is usual,) but only to give the button $f$ a slight turn with the thumb and finger, and the proper and desired adjustment is made.

Having thus described my invention, I claim as new, and desire to secure by Letters Patent—

In combination with a spectacle-frame, the rod D, with glass-rings and glasses attached thereto, and made adjustable, substantially as and for the purposes herein shown and described.

ERASTUS S. CLAPP.

Witnesses:
H. D. STEWART,
CHARLES PRATT.